Patented Jan. 6, 1925.

1,522,040

UNITED STATES PATENT OFFICE.

KARL B. THEWS, OF DENVER, COLORADO, ASSIGNOR TO WILLIAM A. J. BELL, OF DENVER, COLORADO.

ART OF EXTRACTING RADIUM AND OTHER VALUES FROM CARNOTITE ORES AND THE LIKE.

No Drawing. Application filed January 7, 1922. Serial No. 527,711.

*To all whom it may concern:*

Be it known that I, KARL B. THEWS, a German citizen, and resident of Denver, in the county of Denver and State of Colorado, have invented certain new and useful Improvements in the Art of Extracting Radium and Other Values from Carnotite Ores and the like.

This invention deals with the problem of extracting radium and other rare metal values from carnotite and similar ores, which usually contain sulfur compounds in greater or less degree but sufficient in most cases to seriously impair the efficiency of extraction by means of hydrochloric acid as a solvent agent, which is the process chiefly used for the commercial extraction of the values contained in such ores.

The sulfur compounds present in such ores will vary from a practically negligible amount in a few cases, to five or six per cent, when the sulfur content is calculated as sulfates in the ore. Now when the ground ore or concentrate is boiled in the hydrochloric acid bath there is formed radium barium sulfate which being insoluble in the HCl precipitates on the tailings instead of passing off in the acid solution with the other values.

To avoid this precipitation of radium barium sulfate and consequent loss of radium it is the practice to first boil the ground or comminuted ore with very substantial quantities of sodium carbonate often running as high as one-half the whole weight of the ore being treated, or with equivalent chemical, whereby the sulfates present are converted into compounds that are soluble in water, such as sodium sulfate, that are capable of being removed by leaching, thus preventing the radium barium content from being precipitated as sulfate when subjected to the action of the hydrochloric acid solvent. After such carbonation and leaching, the ore is then boiled from one to two hours with HCl to get the maximum solution of the values, and the solution is then decanted and filtered and is thereafter treated by any of the well known methods used for the separate recovery of the radium, vanadium, uranium and barium values contained therein.

Such process of extraction is both time consuming and very expensive and it is the object of the present invention to solve this problem of dealing with the sulfur ingredients in the ore by a method of treatment which will not require any resort to the carbonation process that has heretofore been considered indispensable to the commercially successful extraction, by hydrochloric acid, of radium and other values from carnotite and similar ores, and which will materially improve and cheapen such extraction process without losing the advantages which have made the extraction by hydrochloric acid the preferred process for commercial use.

Now it has long been recognized that a long period of boiling the ore in the hydrochloric acid solution was necessary to get a high percentage extraction of the vanadium content and reasoning from analogy it was assumed that the same was true in regard to the radium content of the ore, so that it has been the established practice to boil the ore in the hydrochloric acid bath for periods ranging from one to three hours or even longer. However, in my experimental research on this problem, I have been led to investigate the subject with great care and have made the very important and significant discovery that when the sulfur content, calculated as sulfates, is substantially below one-tenth of one per cent (.001) of the ore mass to be treated, precipitation of radium barium sulfate does not occur until the boiling in the hydrochloric acid has been continued for a substantial but not a long period of time, yet sufficient to effect a very high extraction of the radium values while prolongation of the boiling beyond a certain critical period, which varies with ores of different quality, will result in the precipitation of radium barium sulfate with consequent loss in the efficiency of radium extraction.

This critical period I have found will vary with variations in the composition of the particular ores being treated but in nearly all cases such precipitation of radium barium sulfate will occur if the ore be boiled in the hydrochloric acid bath substantially longer than one half hour. Indeed in some cases the boiling should be limited to a period of ten minutes or perhaps even less. In applying this important discovery to the problem of extraction by hydrochloric acid I have found that, on the average, maximum extraction of the radium barium content is effected without precipitation as sulfate in the tailings when the boiling operation is continued for a period of approximately 20 minutes but the most efficient period for boiling can best be determined by conducting boiling tests on sample lots taken from the particular batch of ore to be treated, keeping in mind, however, that the vanadium extraction in many cases will be materially lower than that obtainable by prolonging the boiling period. Nevertheless such loss in efficiency of vanadium extraction, when it occurs, is much more than offset by the higher efficiency of the extraction of the immensely more valuable radium content.

Therefore it will be seen that the significant feature of my present discovery in the field of extraction by hydrochloric acid is that there is a critical time period for each grade or quality of sulfate-bearing carnotite beyond which the radium barium content will precipitate from the acid solvent as radium barium sulfate and the acid treatment should cease and the liquid solution should be run off and filtered before the critical point of precipitation be reached.

It is not possible to assert with certainty the explanation of this phenomenon observed by me but it is probable that the radium barium sulfate, at its initial formation or in what may for convenience be termed its nascent state, is in a colloidal condition in which it can pass through the filter but that by further boiling or continuance in the bath it reaches a stage of precipitation. Such theory, at least, seems to be consistent with the action actually observed.

It will be understood from the above explanation that in the treatment of carnotite or other radium bearing ores or concentrates having a sulfur content, reckoned as sulfates, of say substantially less than one tenth of one per cent (.001), the whole carbonation process may be omitted if the period of boiling in hydrochloric acid be not extended to the critical period of precipitation for the particular ore mass under treatment.

Nevertheless it should be observed that the extraction of the radium content does require the exposure of the ore or concentrate to the action of the hydrochloric acid solvent for an appreciable length of time and hence when a large sulfur content is present in the ore, the critical point of precipitation may and will be reached too quickly to allow sufficient time for efficient radium extraction. Now a very large proportion of the known carnotite ores contain one tenth of one per cent (.001) and upwards of sulfur content, reckoned on a sulfate basis some even ranging as high as five or six per cent. In such ores the sulfur content would prevent an efficient extraction of the radium when subjected to the hydrochloric acid bath, because of the quick precipitation that would occur, and thus present a serious problem to deal with.

I have found however that the sulfate most commonly present in carnotite ore is in the form of gypsum and my experiments have demonstrated that it is possible to wash such sulfates out of the ore if the ore when crushed or comminuted to say 20–40 mesh be subjected to a washing or leaching with water, preferably cold water which is a better solvent of gypsum than is hot water. Therefore when the sulfur content calculated as gypsum approaches or exceeds one tenth of one per cent, I wash the comminuted ore or concentrate using say 300–400 parts of water for each part of gypsum assumed to be present from a determination of the sulfur content and in this way desulfate the ore preliminary to treating it with the acid solvent according to the process previously indicated.

Sometimes however in addition to the gypsum or soluble sulfate commonly found in the ore there is present more or less anhydrite ($CaSO_4$) which is insoluble in the cold water bath above described. I have found however that the anhydrite which remains in the ore after washing may be converted into water-soluble sulfate or gypsum by boiling the ore in water. This boiling operation is usually continued about one hour or until the anhydrite is converted into gypsum. The ore bath may then be allowed to cool so as to fully dissolve the gypsum or the hot liquor may be drawn off and the ore may then be washed in cold water to thoroughly dissolve out all the gypsum content.

When anhydrite is present it would probably be preferable to first boil the ore in water to convert the anhydrite and then either cool the ore bath to effect complete solution of the sulfate or decant the hot liquid and wash with cold water.

When dealing with a low sulfate ore or concentrate or with an ore that has been desulfated according to the above methods, the extraction of the values is effected in the following manner.

In treating a batch say of one ton of ore or concentrate I first supply the ore treating tank with an acid bath to the total amount of about 2 tons, the water content being first admitted and then the hydrochloric acid say of 20% to 25% strength and free of sulfur, the quantity of acid being determined according to the amount of acid-neutralizing content, whether metallic or otherwise, present in the ore, and ranging from as low as 600 pounds to as high, in some cases, as 1600 pounds of such acid, when there is a large neutralizing content, but in all cases enough acid should be used so that the bath will remain acid instead of becoming neutralized. The acid bath is then brought to approximately the boiling point preferably by passing live steam into the liquid body and when so heated the ore comminuted say to 20–40 mesh is gradually poured into the bath, which is agitated or stirred to maintain thorough mixing. The boiling continues according to the requirement of the particular ore as above explained taking care not to reach the critical point where radium-barium sulfate begins to precipitate. The liquid containing the values in solution is then run off and passed through a filter, and the tailings are washed and then thrown away. Usually a boiling period of 20 minutes will be sufficient and sometimes even less than this.

It the ore be treated at a much lower temperature than that indicated above it will probably be found in most cases that the reactions occur less rapidly and consequently that the period of acid treatment may be lengthened. Of course the object of heating the bath is to expedite the chemical reactions which put the values into solution, which otherwise would require a longer period.

It will also be understood that in the preliminary washing and boiling treatment employed for desulfating the ore, it is preferred to stir or agitate the mixture to quicken the desired action.

The term ore as used above is intended to cover not only the natural ore before it has been subjected to any chemical or other treatment besides grinding but also the metallic-bearing mineral at any subsequent stage in which it retains workable values, such as concentrates, tailings and the like. There is no prescriptive degree of fineness required for efficient treatment but usually the ore will be ground to a fineness of say from 20 to 40 mesh.

What I claim is:

1. The improvement in the art of extracting rare metal values from carnotite and similar ores by means of hydrochloric acid which consists in subjecting a comminuted body of the ore to the action of hot hydrochloric acid in order to put the radium and other rare metal values into solution and drawing off and filtering the liquid solution before precipitation of radium-barium sulfate begins, substantially as described.

2. The improvement in the art of extracting rare metal values from carnotite and similar ores by means of hydrochloric acid which consists in agitating a comminuted body of the ore immersed in a bath of hydrochloric acid, continuing such treatment for such period of time as will put the maximum of the radium values into solution without precipitation of radium-barium sulfate, and then separating and filtering the value-containing solution from the residue or tailings, substantially as described.

3. The improvement in the art of extracting rare metal values from carnotite and similar ores by means of hydrochloric acid, which consists in first washing the comminuted ore with sufficient water to leach out the soluble sulfate content therefrom, then treating the desulfated ore comprising the sands and metallic values with hydrochloric acid for a sufficient period to secure the maximum solution of radium content without precipitating radium-barium sulfate, and then drawing off the radium containing solution for further treatment to recover the values therein, substantially as described.

4. The improvement in the art of extracting rare metal values from carnotite and similar ores by means of hydrochloric acid, which consists in desulfating the ground ore by subjecting the same to washing with a supply of water approximately equal to 300 to 400 times the quantity of sulfur content calculated as gypsum preliminary to subjecting the ore to treatment with hydrochloric acid for extraction purposes, substantially as described.

5. The improvement in the art of extracting rare metal values from carnotite and similar ores by means of hydrochloric acid, which consists in subjecting the ground ore to the action of hot water to convert its anhydrite content into water soluble sulfate, separating such sulfates dissolved in water from the ore, thereby rendering said ore amenable to treatment with hydrochloric acid for extraction purposes without producing the precipitation on the tailings of radium-barium sulfate, substantially as described.

6. The improvement in the art of extracting rare metal values from carnotite and similar ores by means of hydrochloric acid, which consists in converting the anhydrite content of the ore into water soluble sulfur compounds by treating the ore with hot water, washing out the soluble sulfate content with cold water, then boiling the ore in a hydrochloric acid bath to secure the maximum radium extraction without precipitation of radium-barium sulfate and then drawing off and filtering the value containing solution, substantially as described.

In witness whereof, I have subscribed the above specification.

KARL B. THEWS.